May 12, 1959

W. McMAHON 2,886,749

ELECTRICAL CIRCUIT ELEMENTS COMPRISING
ORGANIC DIELECTRIC MATERIAL

Filed Nov. 29, 1955

INVENTOR
W. McMAHON
BY
*H. O. Wright*
ATTORNEY

INVENTOR
W. McMAHON
BY H. O. Wright
ATTORNEY

INVENTOR
W. McMAHON
BY
H. O. Wright
ATTORNEY

United States Patent Office 2,886,749
Patented May 12, 1959

2,886,749
ELECTRICAL CIRCUIT ELEMENTS COMPRISING ORGANIC DIELECTRIC MATERIAL
William McMahon, Summit, N.J., assignor to Bell Telephone Laboratories, Incorporated, New York, N.Y., a corporation of New York
Application November 29, 1955, Serial No. 549,718
15 Claims. (Cl. 317—258)

This relates in general to dielectric circuit elements, and more particularly to improvements in the electrical characteristics of such circuit elements, the most common of which are capacitors.

Inasmuch as large numbers of capacitors are used in communication systems, in mobile bodies including airplanes, and in numerous other applications in which weight and size are primary considerations, any factor which operates to reduce condenser size, to simplify the fabrication of condensers, or to improve their operating characteristics may result in material economies.

Among the many and vaired forms which capacitors may assume are a large number which include dielectric materials comprising polar organic compounds. For example, such condensers may assume a form in which metal foil electrodes are interleaved with sheets of porous spacers of paper, or the like, which serve as matrices for a polar organic impregnant. In a simpler type of capacitor, a dielectric coating of polar organic material is deposited between a pair of metal plates.

A large number of polar organic compounds have been used, or proposed, as dielectrics for capacitors of the types described. The most desirable materials for this purpose are normally solid polar organic compounds of a waxy consistency, which are characterized by a relatively high dielectric constant and high resistivity. Moreover, polar organic compounds suitable for use as dielectric materials are preferably fusible at temperatures which permit ready fabrication of the capacitors.

In the case of capacitors having porous spacers, the use as impregnants of some polar organic compounds having normally high dielectric constant, has been found to be less effective than might be expected in producing increased capacity. In fact, the dielectric constant of the impregnated spacer usually assumes a value which is substantially less than the weighted average of the dielectric constant of the paper spacer and the impregnant. This loss of effective dielectric constant varies with different impregnants and, in many cases, can substantially nullify any expected advantage of a material of higher dielectric constant over one of lower dielectric constant.

It has been found, as previously disclosed in my application Serial No. 29,877, filed May 28, 1948, now abandoned, that the dielectric constants in certain normally solid, fusible, polar organic compounds, can be substantially increased uniformly in all directions by causing these compounds to solidify in an alternating electrical field. Specific examples of such materials are Halowax (a polychlorinated napthalene), Nitrowax (a mixture of the isomers of nitrodichloro-ortho xylene), or, as a further alternative, trichloro-ortho xylene.

As disclosed in detail hereinafter, it has been found, in accordance with the present invention, that these same materials when solidified in a magnetic field, also exhibit a substantial change in the dielectric constant, which, unlike the change in dielectric constant described in my earlier application, supra, is anisotropic, exhibiting an increase in the direction of the applied magnetic field, and a decrease in the direction at right angles to the applied field. It has been noted, moreover, that each of the polar organic dielectric materials, found operative for the purposes of the present invention, is characterized by a dipolar molecular structure, the polarizability of which persists after solidification.

Thus, for example, a capacitor may be fabricated in accordance with the teachings of the present invention by applying, to a pair of rectangular metal plates, a dielectric coating of one of the materials mentioned above, and exposing the same, during solidification of the coating, to a magnetic field which, assuming an increased dielectric constant is desired, is directed perpendicular to the planes of the plates. Alternatively, in accordance with the persent invention, a similar technique can be applied to a stacked capacitor, comprising a large number of laminae in which layers of metal foil are alternated with paper spacers impregnated with one of the aforesaid materials.

A particular advantage to be derived from applying the techniques of the present invention to fabrication of a capacitor of the latter type is that the possibility of dielectric breakdown during treatment is avoided, regardless of the size of the applied field, or the presence of impurities or metallic layers in the dielectric.

A further feature of the invention, which may be advantageous for some applications, is the anisotropic character of the changes which occur in the dielectric constant. It has been found that when the applied magnetic field is rotated in a given plane about a mass of one of the aforesaid dielectric materials during solidification, the dielectric constant of the treated material is drastically reduced in a direction normal to the plane of rotation of the field.

The various features of the invention will be better understood by a study of the detailed description hereinafter with reference to the attached drawings, in which.

Figure 3:
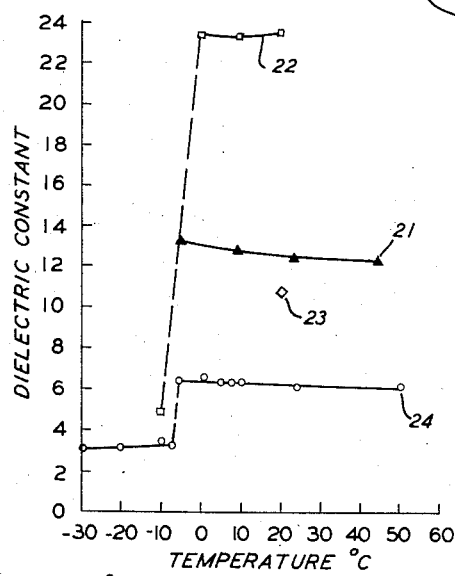

Fig. 3 is a graphical showing of variations in dielectric constant at 1 kilocycle versus temperature in degrees centigrade, for a mass of Nitrowax solidified under the following conditions: curve 21, without applied field; curve 22, in a 6000 gauss magnetic field applied perpendicular to the plates of the capacitor; point 23, in a 6000 gauss stationary magnetic field applied parallel to the plates; and curve 24, in a 2400 gauss rotating magnetic field applied parallel to the plates.

Figure 4:
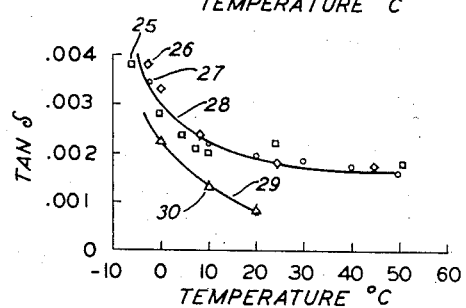
Figure 5:
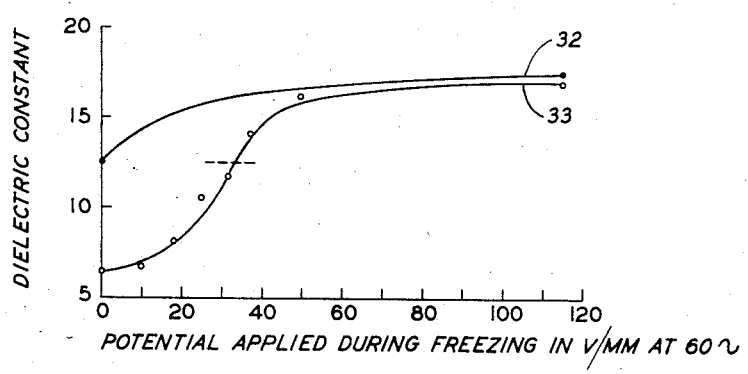
Figure 6:
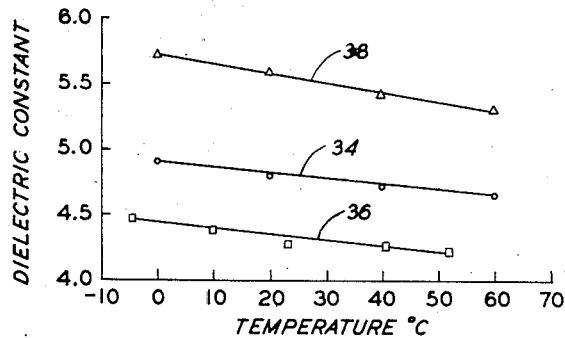
Figure 7:
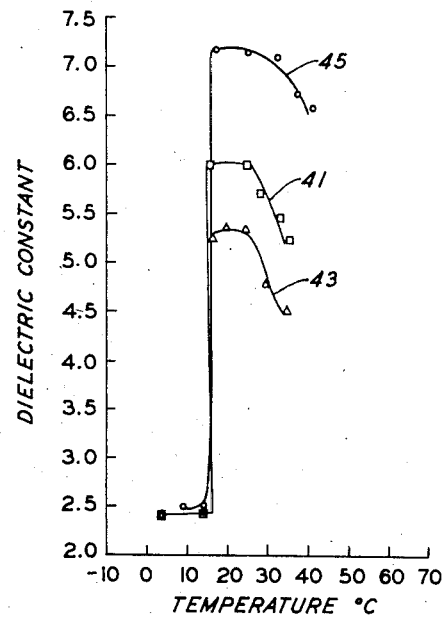
Figure 8:
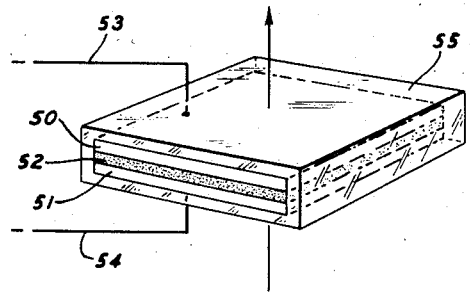
Figure 9:
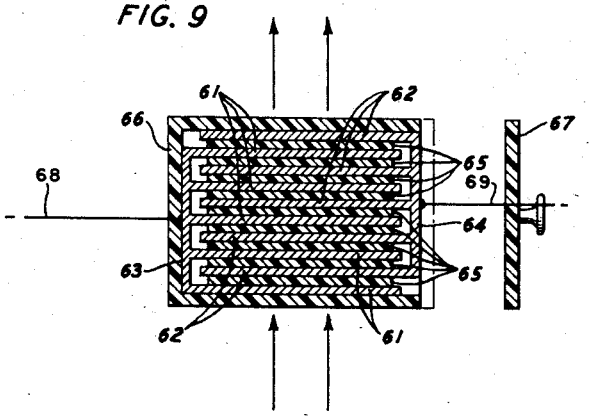

Fig. 4 is a graphical showing of variations in the dielectric loss angle at 1 kilocycle versus temperature for a mass of Nitrowax, wherein points adjacent curve 28 represent material solidified under three conditions, namely: without a magnetic field, in a 2400 gauss rotating magnetic field parallel to the capacitor plates, and in an electric field of 700 volts per millimeter, 60 cycles; and wherein curve 29 represents material solidified in a 6000 gauss magnetic field perpendicular to the plates;

Fig. 5 is a graphical showing of variations in dielectric constant at 1 and 100 kilocycles versus applied alternating potential, at 26 degrees centigrade for Nitrowax solidified under the following conditions: curve 32, in a 60 cycle electric field only; and curve 33, in a 2400 gauss rotating magnetic field superposed on the 60 cycle electric field;

Fig. 6 is a graphical showing of the variations in dielectric constant at 1 kilocycle versus temperature for Halowax solidified under the following conditions: curve 34, without the application of any field; curve 38, in an electric field of 625 volts per millimeter, 60 cycles; and curve 36, in a 2400 gauss rotating magnetic field parallel to the capacitor plates;

Fig. 7 is a graphical showing of the variations in dielectric constant at 1, 10 and 100 kilocycles, versus temperature, for 3,4,5,trichloro-ortho xylene solidified under the following conditions: curve 41, without any applied field; curve 45, in an electric field of 700 volts per millimeter, 60 cycles; and curve 43, in a 2400 gauss rotating magnetic field parallel to the capacitor plates;

Fig. 8 shows a capacitor, in accordance with the present invention, which comprises a pair of parallel metal plates separated by a dielectric coating comprising one of the disclosed polar organic compounds; and Fig. 9 shows a stacked condenser, in accordance with the present invention, which comprises a plurality of laminations in which layers of metal foil are separated by spacer layers such as paper impregnated with one of the disclosed polar organic compounds.

As pointed out in the early portions of the specification, dielectric materials suitable for use in capacitors necessarily combine certain physical and electrical characteristics. These characteristics include, in addition to a relatively high dielectric constant controllable in a manner to be set forth in detail hereinafter, a resistivity of at least about $10^8$ ohm-centimeters. Moreover, in the case of capacitors comprising spacer layers of paper, or the like, which are impregnated with a molten dielectric which subsequently solidifies, the more desirable impregnants have been found to be organic materials of waxy consistency which ordinarily melt at temperatures below about 150 degrees centigrade in order to avoid possible damage to the paper during impregnation.

A class of dielectric materials which has been found to be suitable for the purposes of the present invention comprise those polar organic compounds, polycrystalline in character, whose molecular structure is inherently characterized by the presence of dipoles; and which, upon solidification, retain their polarizability over a useful range of temperatures. For the purposes of the specification and claims hereinafter, the term "dipole" will be defined as set forth on page 25 of "Polar Molecules" by P. Debye, The Chemical Catalog Company, Inc., New York, 1929. Such materials are characterized by a relatively high dielectric constant, substantially in excess of the square of the optical refractive index of the substance. In general, this is at least about four at normal temperatures of 20 degrees centigrade, as measured under direct current potential, or at low or moderate frequencies of, for example, about 1 kilocycle.

Three specific polar organic compounds which are embraced by the classification set forth above, will be disclosed by way of example, as compounds suitable for the purpose of the present invention. The first of these is a mixture of the isomers of mono-nitro-dichloro-ortho xylene, called "Nitrowax," the composition and preparation of which are described in detail in United States Patent 2,374,973 of B. S. Biggs, A. H. White and W. A. Yager, issued May 1, 1945. As described in the aforementioned patent, the principal isomers comprising this mixture are component I: 5-nitro,3,4-dichloro-ortho xylene; and component II: 3-nitro,4,5-dichloro-ortho xylene. These compounds are obtained by chlorinating ortho xylene to approximately the dichloro stage, fractionating the resulting mixture of chlorinated isomers to obtain a fraction consisting essentially of dichloro xylene isomers, and nitrating this fraction to approximately the mononitro stage. The melting point of this mixture is about 80 degrees centigrade, and it has been found to have a dielectric constant of 8.6 at 20 degrees centigrade, measured at a frequency of 1 kilocycle. In some experiments performed in accordance with the present invention, a sample of Nitrowax made by the Hooker Chemical Company, Niagara Falls, New York, was used, which will be designated hereinafter "Nitrowax A," to differentiate it from a sample made at the Bell Telephone Laboratories, Incorporated, which will be designated hereinafter "Nitrowax B," and which was used in other experiments to be described later.

The dielectric constant of Nitrowax, which is dependent upon the proportion of the two principal isomers, is found to be a maximum when the composition consists of about 75 percent of the isomer designated component I, and about 25 percent of the isomer designated component II. Nitrowax B is closer than Nitrowax A to this optimum composition. Consequently, while the general behavior of the two samples is similar, the level of the dielectric constant in Nitrowax B is higher than that in Nitrowax A.

Another compound which has been found to be suitable for the purposes of the present invention, is a mixture of chlorinated napthalenes known commercially as "Halowax," which has a melting point of about 90 degrees centigrade. This material may be prepared in the manner described, for example, in Patent 1,111,289 to G. W. Aylsworth, issued September 22, 1914.

A third compound, also found to be useful for the purposes of the present invention, is a pure single chemical compound 3,4,5-trichloro-ortho xylene, which has a melting point of 95 degrees centigrade. This may best be prepared in the manner set forth in an article by L. E. Hinkel, Journal of The Chemical Society of London (1920), volume 117, page 1301.

The structures of the compounds Nitrowax, Halowax, and 3,4,5 trichloro-ortho xylene indicate that they are diamagnetic. Accordingly, as a possible explanation for the behavior of the materials in the magnetic field, one is led to postulate the following mechanism of orientation of the molecules, through diamagnetic coupling with the field. Diamagnetic anisotropy is observed in many aromatic ring compounds, and according to Selwood (Magneto-Chemistry, Interscience Publishers, New York, 1943), the principal susceptibility is generally perpendicular to the plane of the ring. Hence, in a magnetic field, it is believed that such molecules tend to orient so that the plane of the rings is parallel to the magnetic field. It is further believed that because the rings constituting these compounds are substantially planes, the electric dipoles will lie in the planes of the rings. Hence, in the case of Nitrowax, for example, the resultant of the electric vectors would point from the nitro and chloro groups toward the methyl groups. From this hypothesis, it can be deduced that in the molecules comprising the three compounds named above, the axes of highest polarizability are perpendicular to the direction of principal diamagnetic susceptibility.

Figure 1:
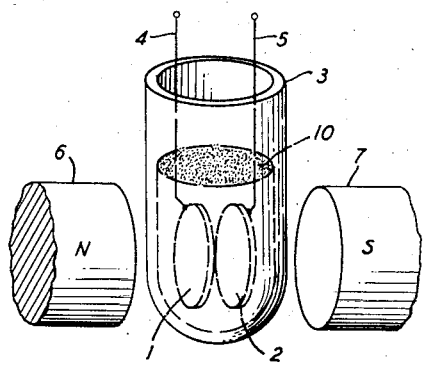
Fig. 1 shows a test cell including a solid mass of Nitrowax in which a pair of disk-shaped electrode plates are submerged parallel to each other and to the principal axis of the cell, and perpendicular to an applied magnetic field.

As indicated in Fig. 1 of the drawings, a pair of parallel plates 1 and 2, consisting, for example, of gold-plated brass, were placed in a test tube cell 3, which in the specific example under description, comprises a heat-resistant test-tube of Pyrex, or the like. In this arrangement, the plates 1 and 2 were positioned with their principal surfaces parallel to the longitudinal axis of the test-tube cell 3. The connecting leads 4 and 5 were respectively soldered to points on the external surfaces of each of plates 1 and 2. The cell 3 was then filled with molten mass 10 of Nitrowax B to a level completely covering plates 1 and 2; and the connecting leads 4 and 5 were brought out through the mouth of tube 3.

Without the application of any field, the molten mass 10 of Nitrowax B was allowed to solidify. Measurements were made at 1 and 100 kilocycles of the capacity and conductance between the terminal leads 4 and 5, using a capacity bridge of the type described by Shackelton and Ferguson, Bell System Technical Journal, volume 7, page 70 (1928).

From these measurements, the dielectric constant $\epsilon'$ and dielectric loss $\epsilon''$ were computed for Nitrowax B, after solidification without any applied field.

The resultant values of dielectric constant, plotted as a function of temperature, are indicated by the solid triangles on curve 21 in Fig. 3 of the drawings. Over a range from about −5 to +45 degrees centigrade, the dielectric constant diminished from a little more than 13 to a little more than 12.

With the mass 10 of Nitrowax B in the molten state, the test-tube 3 was placed in a uniform magnetic field having a strength of 6000 gauss, which was perpendicular to the plane of the metal plates 1 and 2. The magnetic field was produced by an electromagnet, the structure of which is not shown, and which is represented by the opposing pole-pieces 6 and 7.

When the Nitrowax B solidified, the test-tube cell 3 was removed from the field. The capacitance of the cell was measured at 1 and 100 kilocycles in the manner indicated by Shackelton and Ferguson in the preceding paragraphs, and from these measurements, the dielectric constant was recomputed. The constant was found to be much larger than normal, that is, more than 23 in the range from zero to 20 degrees centigrade. These values of dielectric constant plotted as a function of temperature are indicated as small hollow rectangles on curve 22, Fig. 3.

Figure 2:
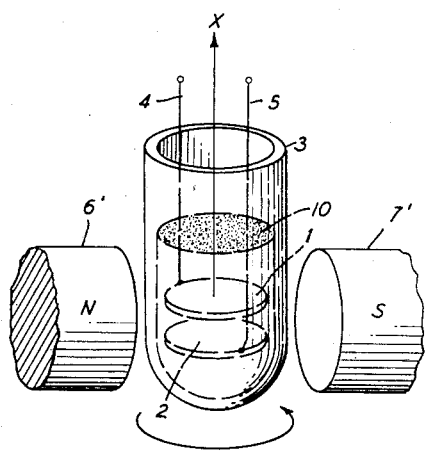
Fig. 2 shows a cell similar to that of Fig. 1, except that the submerged plates are perpendicular to the principal axis of the test cell, and parallel to the direction of the applied magnetic field. An arrow indicates the direction of possible rotation of the field in a plane parallel to the planes of the plates.

The mass 10 of Nitrowax B was then remelted and the test cell 3 again placed in the magnetic field. In this case, as indicated in Fig. 2, the capacitor plates 1 and 2 were positioned at right angles to their former positions, so that the 6000 gauss magnetic field was directed parallel to the surfaces of the plates. When the Nitrowax B solidified, it was found that the dielectric constant measured at 1 and 100 kilocycles was somewhat smaller than the normal value, dropping to a value slightly less than 11, as indicated by the diamond shaped point 23 in Fig. 3.

Thus, in contrast with the isotropic change in the dielectric constant, produced by the application of an electric field during solidification of Nitrowax and other polar dielectric materials, as described in my application Serial No. 29,877, supra, it appears that the presence of a magnetic field during solidification of these same materials produces an effect which is distinctly directional.

It is therefore postulated that when a dielectric material of the composition mentioned is solidified in a magnetic field, the dipolar molecules thereof tend to orient themselves with an axis of highest electrical polarizability in the direction of the magnetic field. In any direction at right angles to this, however, the molecules will not necessarily present an axis of lowest polarizability, because there is no restriction on their angular position about the axis parallel to the magnetic field. Hence there will be only a small tendency toward lower-than-average polarizability in any direction at right angles to the field. This theory tends to be supported by the reduced value of dielectric constant for the condition in which the magnetic field is directed parallel to the plates, as indicated by point 23 in Fig. 3.

It follows from the foregoing, that if it were physically possible to apply to one of the above-mentioned dielectric compounds during solidification, two discrete magnetic fields at right angles to each other, then the dielectric constant of the compound should be greatly reduced in a third direction at right angles to the two fields.

Since it is well known that two magnetic fields in the same region combine to form one, it is not possible to test this postulation experimentally. However, this condition can be approximated by solidifying one of the compounds described in a rotating magnetic field, and then measuring its dielectric constant in the direction at right angles to the radial direction of the field.

Referring again to Fig. 2, the test cell 3 filled with a molten mass 10 of Nitrowax B, was placed between pole-pieces 6' and 7' in a magnetic field of 2400 gauss. A mechanism (not shown) enabled the electromagnet comprising the aforesaid pole-pieces 6' and 7' to be rotated, in the direction indicated in Fig. 2, at 112 revolutions per minute. The plates 1 and 2 of this test cell were parallel to the magnetic field, so that the direction indicated by the axial line $x$, in which the dielectric constant was subsequently measured, was perpendicular to the field. When the mass 10 of Nitrowax B had solidified, it was removed from the field, and dielectric constant was measured at 1 and 100 kilocycles in the manner previously indicated. Curve 24 in Fig. 3 shows this value (indicated by the small circles) to remain constant at slightly above 6 over a wide temperature range from about −5 to +50 degrees centigrade. It is apparent that polarizability in this direction is markedly lower than average.

An approximate equation for the polarization of Nitrowax based on the experiments described in the foregoing paragraphs may be derived by the following steps. The polarization of the unoriented Nitrowax B, solidified without an electric field, is represented by the following equation:

$$\frac{\epsilon'-1}{\epsilon'+2}F = \alpha + \frac{2B_1+B_2}{3} \qquad (1)$$

In this expression:

$\epsilon'$ = measured dielectric constant, material untreated;
$F$ = a constant which includes molecular weight, and density;
$\alpha$ = that part of the polarization which is independent of the treatment of the Nitrowax during solidification;
$B_1$ = dipolar polarizability along one of the two axes of highest polarizability which lie in the plane of the ring, and are perpendicular to each other; and
$B_2$ = dipolar polarizability along the axis of lowest polarizability, which is perpendicular to the plane of the ring.

Substituting actual values for the dielectric constant, $\epsilon'$ at 20 degrees centigrade, the left-hand side of Equation 1 becomes:

$$\frac{12.8-1}{12.8+2}F = .798F$$

When the Nitrowax B undergoes transition (at substantially −5 degrees centigrade) all curves tend to come together. At this point $\epsilon'$, the dielectric constant, is found to equal 3.5. Hence, $$\alpha = \frac{3.5-1}{3.5+2}F = .455F \qquad (2)$$

When Nitrowax B is solidified in a strong stationary magnetic field, it is assumed that orientation in the direction of the field results in essentially all $B_1$ type polarization. Under this condition, the dielectric constant at 20 degrees centigrade is 23.5 (see curve 22, Fig. 3). Then, substituting this value, and substituting $B_1$ and $B_2$ in Equation 1:

$$\frac{23.5-1}{23.5+2}F = \alpha + B_1 = .833F \qquad (3)$$

$$B_1 = .428F$$

Combining Equations 1, 2 and 3:

$$\frac{2B_1+B_2}{3} = .343F$$

and $$B_2 = .173F$$

The calculated dielectric constant $\epsilon'$ for Nitrowax B for polarization of type $B_2$ only, with no $B_1$ type polarization, is 6.06.

The calculated value corresponds closely to the experimental value, 6.3, obtained for the dielectric constant of Nitrowax B solidified in the rotating field of 2400 gauss, measured perpendicular to the field, where essentially all polarization is believed to be of the $B_2$ type (see Fig. 3, curve 24).

Moreover, when a polar organic compound of one of the types mentioned is solidified in the stationary magnetic field, its polarizability at right angles to the direction of the field can be computed from the average of the constants $B_1$ and $B_2$. Substituting the values derived in Equations 1, 2, and 3 above, and calculating the dielectric constant from the following expression:

$$\frac{\epsilon'-1}{\epsilon'+2}F = \alpha + \frac{B_1+B_2}{3} \quad (4)$$

$$\epsilon' = 10.25$$

The above is also in fair agreement with the measured value 10.85 as indicated by point 23 of Fig. 3.

The tangent of the loss angle, which is measured by the ratio of the dielectric loss to the dielectric constant, measured at 1 kilocycle for Nitrowax B, solidified in various fields, as plotted against temperature in degrees centigrade, is shown in Fig. 4.

The small diamonds 26 indicate tangent values measured when no field is applied during solidification of Nitrowax B; and the small circles 27 indicate values of loss tangent at various temperatures, when a 60 cycle alternating-current field of 700 volts per millimeter is applied across plates 1 and 2, in a manner indicated in my application Serial No. 29,877, supra. All of these values fall fairly close to the curve 28.

The small squares 25 indicate tangent values of the loss angle measured when the dielectric material Nitrowax B is solidified in the presence of a 2400 gauss rotating field, arranged as indicated in Fig. 2, with the applied magnetic field parallel to the capacitor plates 1 and 2.

Curve 29 passes through several points indicated by small hollow triangles 30, which represent values of loss angle for Nitrowax B to which a 6000 gauss magnetic field has been applied perpendicular to capacitor plates 1 and 2 during solidification, in the manner of Fig. 1.

It may be seen, that with the exception indicated by the latter curve 29, a change in dielectric constant is accompanied by a proportionate change in dielectric loss. In the exceptional case mentioned, Nitrowax B was solidified in a stationary magnetic field and the measurements of dielectric constant were made in the direction of that field. This treatment produced an increase in dielectric constant, with the loss remaining essentially the same as that of the Nitrowax solidified without the field.

The variations in the dielectric constant which result from solidifying Nitrowax B in a rotating magnetic field and in an alternating electric field simultaneously, are shown graphically in Fig. 5. In this experiment the strength of the rotating magnetic field, which was applied in the manner indicated with reference to Fig. 2, was kept at a constant value of 2400 gauss. The 60 cycle alternating-current electric field, applied in the manner indicated in my application Serial No. 29,877, supra, was varied from zero to 115 volts per millimeter in the thickness direction normal to the electrode of the dielectric material. Curve 32 represents the variation in value of dielectric constant of the treated Nitrowax B over the range mentioned, when only the electric field was applied. Curve 33 shows the range of variation of dielectric constant when a rotating 2400 gauss magnetic field is superposed on the electric field. Measurements of dielectric constant were made at 1 kilocycle, and at 100 kilocycles at a temperature of 26 degrees centigrade. It may be seen that the magnetic field tends to decrease the dielectric constant in the direction measured, that is, in a direction perpendicular to the electrode plates, but that its effect is counteracted by the electric field. When the electric field reaches about 33 volts per millimeter, the dielectric constant of the Nitrowax B is the same as though no field were present.

Similar experiments, which were carried out using Halowax (a mixture of chlorinated napthalenes) as a dielectric, are indicated in Fig. 6 of the drawings. Curve 34 shows values, represented as small circles, of dielectric constant for Halowax solidified without field, plotted against temperature, in the range zero to 60 degrees centigrade. Curve 36 shows values, represented as small squares, plotted for a somewhat similar range of temperatures, for Halowax solidified in a 2400 gauss rotating magnetic field, applied parallel to the plates 1 and 2 in the manner of Fig. 2. Curve 38 shows values of dielectric constant represented as small triangles, for Halowax solidified in an alternating electric field of 625 volts per millimeter, 60 cycles, as measured over a similar range of temperatures. Measurements were made at a frequency of 1 kilocycle. The response of Halowax to these conditions is similar to that of Nitrowax, but it will be seen that the changes are of smaller magnitude.

Similar characteristic changes in the solid-state dielectric constant of the third compound mentioned, 3,4,5 trichloro-ortho xylene, after treatment in a magnetic field, and in an electric field, are shown in Fig. 7 of the drawings, in which changes in dielectric constant are plotted against temperature. Curve 41, plotted from measured values indicated as small squares, represents the condition in which no field is applied during solidification. Curve 43, plotted from points indicated as small triangles, represents a condition in which a 2400 gauss rotating magnetic field is applied parallel to plates 1 and 2, in the manner described with reference to Fig. 2. Curve 45, plotted from points indicated as small circles, is a comparative showing for the condition in which trichloro-ortho xylene is solidified in a 700 volt per millimeter, 60 cycle alternating-current field, in the manner described in application Serial No. 29,877 supra.

It is apparent from the curves described in the foregoing paragraphs, that the electric field increases the dielectric constant, whereas the rotating magnetic field causes a decrease in a direction perpendicular to the plane of the rotating field. As is apparent from an inspection of the curves of Fig. 7, 3,4,5 trichloro-ortho xylene undergoes a transition at 15 degrees centigrade which, as in the case of Nitrowax, is not altered by the manner in which it is solidified.

In accordance with the present invention, a molten mass of one of the disclosed polar organic compounds which fills the space between a pair of capacitor electrode plates, is allowed to solidify in a magnetic field directed perpendicular to the surface of the capacitor plates, in the manner indicated, for example, in Fig. 1 of the drawings, thereby producing an increase in the dielectric constant in the direction of the thickness of the dielectric material.

It will be apparent that the process described is adapted to the treatment of the dielectric material of any of the various types of capacitors in which one of the fusible polar organic compounds described in the foregoing pages is used as a dielectric.

Referring to Fig. 8 of the drawings, a pair of aluminum plates 50, 51, each having a cross-sectional thickness of, say, 1/8 inch, are spaced apart about .04 inch, parallel to one another, against opposite walls of a rectangular container 55 comprising a suitable insulating material, such as polyethylene. The latter serves as a protective coating for the finished condenser, and also as a container for the molten mass 52 of Nitrowax, which is heated to a temperature in excess of 80 degrees centigrade, and poured between the plates 51 and 52, through an open end of the container 55. The assemblage is then placed with the principal surfaces of the plates 51, 52 at right angles to the direction of a uniform magnetic field of, for example, 6000 gauss, until the Nitrowax dielectric solidifies. Output leads 53 and 54 provide electrical connection to the respective electrode plates 50 and 51.

Although in the case under description, a significant increase in the dielectric constant is obtained by application of a field of 6000 gauss, it will be apparent that smaller or larger fields may be applied without fear of breakdown, depending on the dielectric material employed, and the desired degree of increase in the dielectric constant. It will also be apparent that in order to obtain a marked reduction in the dielectric constant in a selected direction, a rotating field may be applied during solidification in the manner indicated with reference to Fig. 2 of the drawings.

Fig. 9 of the drawings shows a stacked capacitor, to which the process of the present invention is particularly applicable. Assume that a capacitor is to comprise a stack of rectangular sheets of foil 61, alternately interleaved with a stack of similar sheets 62. Electrode sheets 61 are connected together on one end, as shown, to a common electrical contacting member 63, and electrode sheets 62 are similarly connected together on the opposite end to a common electrical contacting member 64.

Between each pair of electrodes 61 and 62, is interposed a spacer layer 65 of, for example, polyethylene. The entire assemblage is then placed in an insulating container 66, of polyethylene or the like, and the combination, including container 66, is then placed in an evacuated chamber. An impregnant, which may comprise any of the disclosed polar organic compounds, such as, for example, Halowax, heated substantially above its melting point, is forced into the niches between the spacer layers 65, through the removable end of the case 66. Assuming, for example, that Halowax is used, the molten impregnant is allowed to solidify in a 6000 gauss magnetic field directed, as shown by the arrows, perpendicular to the surfaces of the electrode sheets 61, 62. Leads 68 and 69 making electrical contact with the members 63 and 64 respectively, serve as output leads for the capacitor.

As pointed out previously, the size and direction of the magnetic field can be varied, as taught with reference to Figs. 1 and 2, in accordance with whether it is desired to increase or decrease the dielectric constant, and the desired directional characteristic for the constant.

Although several specific types of dielectric circuit elements have been disclosed by way of illustrating the principles of the present invention, additional applications of these principles within the scope of the appended claims, will be readily apparent to those skilled in the art.

What is claimed is:

1. The method of improving the properties of an electrical circuit element including as a dielectric a polar organic compound having a dielectric constant substantially in excess of the square of its refractive index which comprises solidifying said compound, and deliberately subjecting said compound during solidification to an artificial magnetizing force.

2. The method of improving the properties of an electrical circuit element in accordance with claim 1 wherein said artificial magnetizing force comprises a magnetic field of at least about 1000 gauss.

3. A method in accordance with claim 1, in which said organic dielectric compound comprises a mixture of the isomers of nitro-dichloro xylene.

4. A method in accordance with claim 1, in which said organic dielectric compound comprises a mixture of polychlorinated napthalenes.

5. A method in accordance with claim 1, in which said organic dielectric compound comprises 3,4,5 trichloro-ortho xylene.

6. A method of processing an electrical circuit element comprising at least one pair of parallel non-magnetic metal plates having interposed therebetween a dielectric layer comprising a mass of a polar organic compound having a dielectric constant of at least about 4 at 20 degrees centigrade, which method comprises cooling said organic compound from a temperature at which said organic compound is molten to a temperature at which said organic compound is solid, and directing an artificially generated magnetic field perpendicular to the principal planes of said plates.

7. A method of processing an electrical circuit element, comprising at least one pair of parallel non-magnetic metal plates having interposed therebetween a dielectric layer comprising a mass of polar organic compound having a dielectric constant of at least about 4 at 20 degrees centigrade, which method comprises cooling said organic compound from a temperature in which said organic compound is molten to a temperature at which said organic compound is solid, and directing an artificially generated magnetic field parallel to the principal planes of said plates.

8. A method in accordance with claim 7, wherein said magnetic field is rotated in a plane parallel to the principal planes of said plates.

9. A method of improving the properties of an electrical capacitor made up of a plurality of non-magnetic electrode layers separated by porous spacers impregnated with a polar organic dielectric compound having a dielectric constant of at least about 4 at 20 degrees centigrade, which method comprises cooling said capacitor from a temperature in which said organic compound is molten to a temperature at which said compound is solid, and deliberately subjecting said capacitor to an artificial magnetizing force for the duration of said cooling process.

10. The method of improving the properties of an electrical capacitor in accordance with claim 9 wherein said artificial magnetizing force comprises a magnetic field in excess of 1000 gauss directed perpendicularly to the principal planes of said layers.

11. A method of improving the properties of a stacked capacitor made up of a plurality of non-magnetic electrode layers separated by a plurality of spacer layers impregnated with a polar organic dielectric compound having a dielectric constant of at least about 4 at 20 degrees centigrade, which method comprises cooling said capacitor at a temperature in which said organic compound is molten to a temperature at which said compound is solid, and directing an artificially generated magnetic field perpendicular to the planes of said electrodes.

12. An electrical circuit element including a mass comprising a solid polar organic polycrystalline dielectric material which has been exposed to an artificial magnetizing force during solidification so that the dielectric constant in said material has a space variation which is substantially anisotropic.

13. An electrical circuit element including a layer comprising a solid polar organic polycrystalline dielectric material which has been exposed to an artificial magnetizing force during solidification which imposed on the dielectric constant in said material a characteristic which differs substantially when measured in different directions in said material.

14. An electrical circuit element including a layer comprising a pair of opposing major bounding surfaces, and having a relatively small thickness dimension in a direction transverse to said surfaces, said layer comprising a solid polar organic polycrystalline dielectric material which has been exposed to an artificial magnetizing force during solidification which imposed on the dielectric constant in said material a characteristic which differs substantially when measured in different directions, and which is substantially a maximum in the thickness direction in said layer.

15. An electrical capacitor which includes a layer comprising a solid polar organic dielectric material which has been exposed to an artificial magnetizing force during solidification which imposed on the dielectric constant in said material a characteristic which differs substantially in different directions in said material, and which is a maximum in the direction of the electrical field in said capacitor.

References Cited in the file of this patent
UNITED STATES PATENTS

| | | |
|---|---|---|
| 1,111,289 | Aylsworth | Sept. 22, 1914 |
| 1,864,828 | Joffe | June 28, 1932 |
| 1,886,236 | Meissner | Nov. 1, 1932 |
| 2,046,476 | Meissner | July 7, 1936 |
| 2,384,541 | Fruth | Sept. 11, 1945 |